Jan. 20, 1925.
G. W. FERGUSON
ELECTRIC TROLLEY POLE
Filed Nov. 7, 1921
1,523,477
2 Sheets-Sheet 1
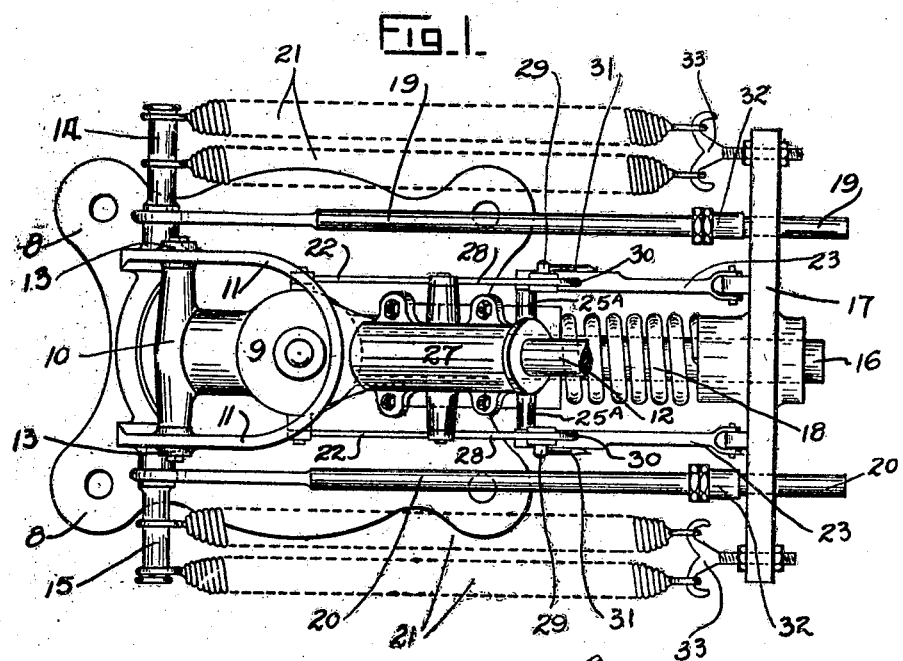
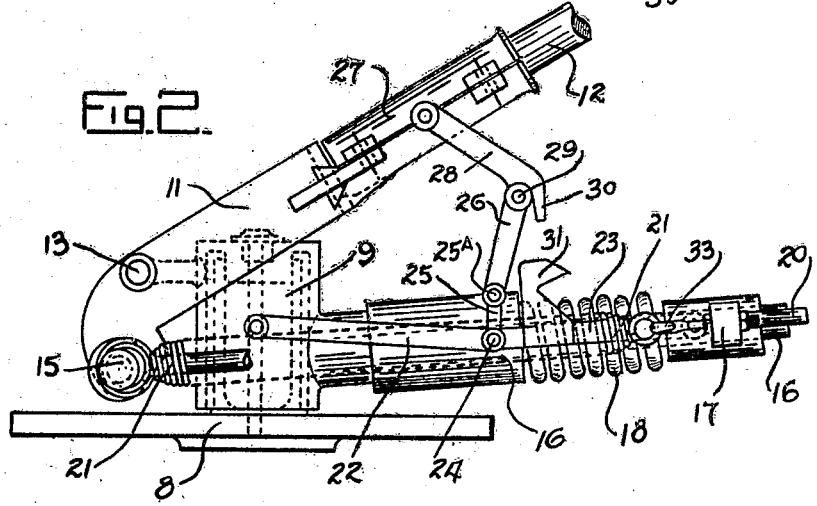
Inventor-
George Welsh Ferguson
By - B. Singer, Atty.

Jan. 20, 1925.  
G. W. FERGUSON  
ELECTRIC TROLLEY POLE  
Filed Nov. 7, 1921  
1,523,477  
2 Sheets-Sheet 2

Inventor-
George Welsh Ferguson
By B. Singer, Atty

Patented Jan. 20, 1925.

1,523,477

UNITED STATES PATENT OFFICE.

GEORGE WELSH FERGUSON, OF CROYDON, NEAR SYDNEY, NEW SOUTH WALES, AUSTRALIA.

ELECTRIC TROLLEY POLE.

Application filed November 7, 1921. Serial No. 513,498.

*To all whom it may concern:*

Be it known that I, GEORGE WELSH FERGUSON, a subject of the King of Great Britain, residing at Croydon, near Sydney, in the State of New South Wales, Commonwealth of Australia, have invented certain new and useful Improvements Relating to Electric Trolley Poles, of which the following is a specification.

This invention has reference to electric trolley poles, and has been devised with the object of providing reliable means to prevent damage to the overhead wires should the trolley leave its conducting wire, said means causing the pole to fall below said overhead wires and be retained, enabling the pole to be readily reset by the attendant.

The invention consists essentially in counteracting the effect of the springs which maintain the trolley against its wire when it is carried past said wire. This is performed by means of a series of levers, preferably knuckle jointed, capable of a toggle movement, allowing the pole to descend by gravity. Means are provided to retain the pole in the lowered position until released for re-setting by an attendant.

But in order that the invention may be more readily comprehended I will refer to the accompanying two sheets of drawings which illustrate the preferred construction.

Figure 1 illustrates a plan view of the apparatus in the running position, while Figure 2 is a side elevation of Figure 1, partly broken away for sake of clearness.

Figure 3:
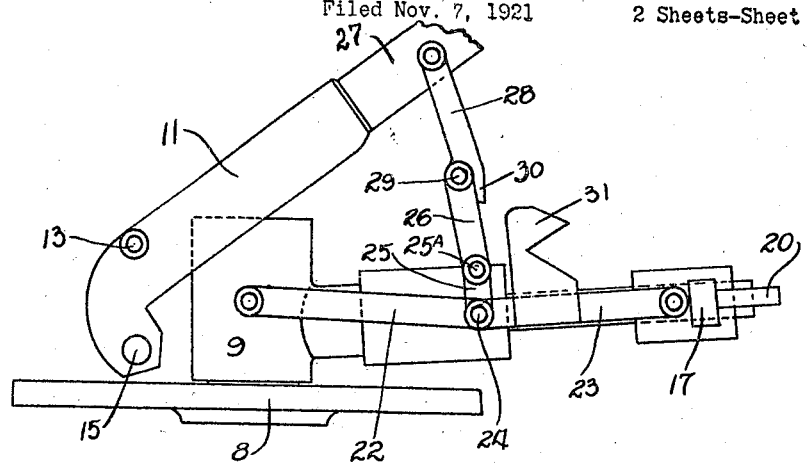
Figure 4:
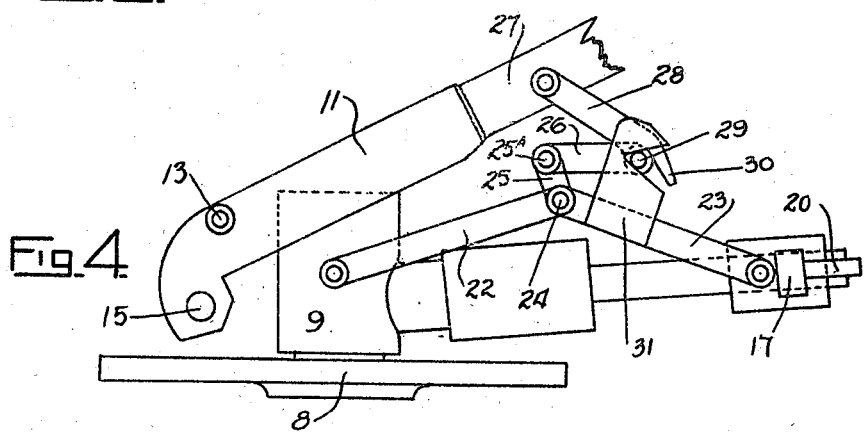
Figure 5:
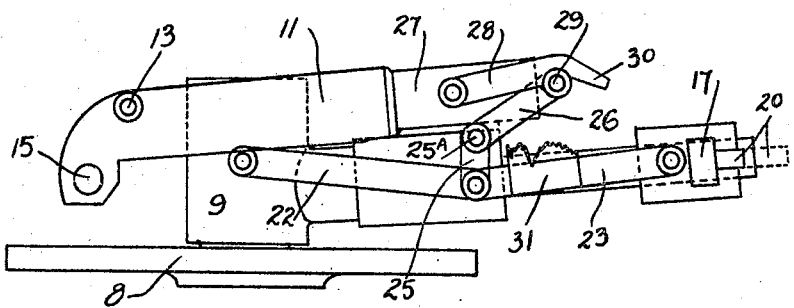

Figures 3, 4, and 5 are diagrammatic side views of the apparatus in the respective positions, namely, when the trolley has left its conducting wire, when the pole is in lowered and locked position, and when it is ready for resetting. In Figure 5 the retaining catch is partly broken away.

The same numerals indicate the same or corresponding parts.

8 is a base secured on the car top or roof, and provided with a cap 9 adapted to revolve freely on said base carrying the mechanism with it. To this cap 9 is connected an extension 10 to which the U shaped fork 11 carrying the trolley pole 12 is pivoted at 13, arms 14 and 15 being provided at each side of the fork 11. A rigid bar or rod 16 extends longitudinally from the cap 9 and upon it slides a transverse bar 17, a spring 18 being interposed between this bar 17 and the cap 9 to act as a buffer. Stay rods 19 and 20, preferably provided with adjustable stops 32, are positioned on either side of the bar 16 connecting the arms 14 and 15 of the fork 11 to the transverse bar 17. On the latter are suitable hooked bolts 33 engaged by springs 21 whose opposite ends are connected to the arms 14 and 15.

To the cap 9 the ends of two levers 22 are connected, and to the transverse bar 17 are connected another pair of levers 23, those on each side being pivoted together at 24 forming knuckle joints. Extending upwardly from the levers 22 are extensions 25 to which are attached connecting levers 26 by a transverse rod or bar 25^A. The trolley pole socket 27 has pivotally attached to it on opposite sides, levers 28 which are also pivoted to the levers 26 by pivot pins 29, extensions 30 being formed on levers 28 to act as stops as shown in Figure 3. Spring catches 31 are provided on the levers 23 to retain the pivot pins 29 when in the locked position as shown in Figure 4.

Figures 1 and 2 show the position of the mechanism when the trolley pole is in the running position in which case the levers 22 and 23 are depressed below their centres. The levers 26 and 28 are not then acting and have no pull on the levers 22 and 23, consequently the tension springs 21 hold the transverse bar 17 in position and exert a pull on the U shaped fork 11 thereby keeping the trolley pressed against the overhead wire. When the trolley misses its overhead wire, and rises momentarily upwardly in the position shown in Figure 3, the levers 28 and 26 straighten out with a toggle movement and thereby exert a pull on the pivot 24 and carry the levers 22 and 23 past their centres. The transverse bar 17 presses against the stops of the stay bars 19 and 20 and thus prevents any further contraction of the springs 21. The weight of the trolley pole then causes it to move downwardly and allows the pivot pins 29 to engage in the spring catches 31 and so maintain the pole in the retrieved position as shown in Figure 4.

To replace the trolley on its wire the pole is pulled down by a cord or the like (not shown) to the position shown in Figure 5 in which position the levers 22 and 23 are reset, whereupon the trolley can be guided by the attendant and replaced on its overhead wire.

It is to be understood that I do not restrict myself to the exact construction as illustrated. For example, it is obvious that springs either in compression or tension would give the desired motion to the trolley pole.

I claim:—

1. The combination of an electric trolley pole provided with tension springs to maintain the trolley against its conducting wire, a slidable transverse bar to which said springs are attached, a fixed base having a revoluble cap, a compression spring between said bar and said cap and a series of jointed levers having a double toggle action and connected to said bar, said cap and to the trolley pole.

2. The combination of a trolley pole having a fork at its lower end provided with lateral extensions, a fixed base having a revoluble cap on which said lower fork of the trolley pole is pivotally mounted, longitudinal stay rods pivoted to said extensions of the fork, a transverse bar connecting and slidably mounted on said extension rods, a compression spring between said bar and said cap, a series of jointed levers having a double toggle action and connected to said bar, said cap, and to the trolley pole, and tension springs connecting said extensions and said transverse bar, the said stay rods having adjustable stops to limit the movement of said transverse bar toward the head.

3. In an electric trolley pole, the combination with a cap pivotally supported on a base and carrying the pole mechanism, of longitudinal stay rods pivoted to extensions on the fork and adapted to slide in a resiliently mounted transverse bar, and a compression spring to act as a buffer between the said transverse bar and the cap on descent of the trolley pole.

In testimony whereof I have hereunto set my hand.

GEORGE WELSH FERGUSON.